(12) United States Patent
Lombardi et al.

(10) Patent No.: US 10,303,905 B2
(45) Date of Patent: May 28, 2019

(54) METHOD AND SYSTEM FOR ASSET TRACKING IN AN ENTERPRISE ENVIRONMENT

(71) Applicant: BlackBerry Limited, Waterloo (CA)

(72) Inventors: Robert Joseph Lombardi, Hamilton (CA); Timothy Herbert Kyowski, Kitchener (CA); Jasmin Mulaosmanovic, Waterloo (CA); Riyaz Shamshudin Jamal, Waterloo (CA); Vytautas Robertas Kezys, Ancaster (CA)

(73) Assignee: BlackBerry Limited, Waterloo, Ontario (CA)

( * ) Notice: Subject to any disclaimer, the term of this patent is extended or adjusted under 35 U.S.C. 154(b) by 40 days.

(21) Appl. No.: 15/649,814

(22) Filed: Jul. 14, 2017

(65) Prior Publication Data

US 2017/0308727 A1    Oct. 26, 2017

Related U.S. Application Data

(63) Continuation of application No. 14/835,836, filed on Aug. 26, 2015, now Pat. No. 9,740,892.

(51) Int. Cl.
*G06K 7/10* (2006.01)
*G06K 17/00* (2006.01)
*G06Q 10/08* (2012.01)

(52) U.S. Cl.
CPC ..... *G06K 7/10019* (2013.01); *G06K 7/10108* (2013.01); *G06Q 10/08* (2013.01); *G06K 2017/0051* (2013.01)

(58) Field of Classification Search
CPC ................... G06K 7/10108; G06K 2017/0051
See application file for complete search history.

(56) References Cited

U.S. PATENT DOCUMENTS

| | | |
|---|---|---|
| 2006/0176177 A1 | 8/2006 | Heinze et al. |
| 2009/0309732 A1 | 12/2009 | Truscott et al. |
| 2010/0315203 A1 | 12/2010 | Peden et al. |
| 2014/0253293 A1 | 9/2014 | Sadr |

OTHER PUBLICATIONS

Xu et al: "Accuracy of Location Identification with Antenna Polarization on RSSI", Proceedings of the International MultiConference of Engineers and Computer Scientists 2009 vol. I, IMECS 2009, Mar. 18-20, 2009, Hong Kong.

(Continued)

*Primary Examiner* — Daniell L Negron
(74) *Attorney, Agent, or Firm* — Rowand LLP

(57) ABSTRACT

A method and system for tracking an asset in an indoor facility. The method includes receiving, from a first mobile device, an asset tracking tag collision report, the asset tracking tag collision report including a tag identifier of an asset tracking tag associated with an asset; determining a new location of the asset based on the received asset tracking tag collision report; updating an asset location database to indicate the new location of the asset; and, in response to determining the new location of the asset, transmitting an instruction message to a mobile device to cause the mobile device to direct the asset tracking tag to cease broadcasting the wireless signal. The method and system use crowdsourcing to determine a new location of an asset that has moved in an indoor facility.

21 Claims, 3 Drawing Sheets

(56) References Cited

OTHER PUBLICATIONS

Kyamakya et al.: "An Indoor Bluetooth-Based Positioning System: Concept, Implementation and Experimental Evaluation", Institute of Communications Engineering, Jan. 2013.
Fernandes: "Indoor Localization Using Bluetooth", Proceedings of the 6th Doctoral Symposium in Infromalitics Engineering, Jan. 27-28, 2011.
EPO, EP Office Action relating to EP application No. 16183822.2, dated Sep. 26, 2017.
EPO, Extended European Search Report relating to EP application No. 16183822.2, dated Sep. 30, 2016.
EPO, EP Examination Report relating to EP application No. 16183822.2, dated Jan. 21, 2019.

METHOD AND SYSTEM FOR ASSET TRACKING IN AN ENTERPRISE ENVIRONMENT

CROSS-REFERENCE TO RELATED APPLICATIONS

The present application is a continuation of U.S. patent application Ser. No. 14/835,836 filed Aug. 26, 2015, the contents of which are hereby incorporated by reference.

TECHNICAL FIELD

The present disclosure relates to asset tracking, and more particularly, to systems and methods for tracking locations of assets in an enterprise environment.

BACKGROUND

Asset management is a key component of an enterprise environment. A challenge in an enterprise environment is the tracking of physical locations of assets, such as inventory and equipment, within the confines of the enterprise's facilities. For example, in a company office building or campus, assets may often be removed from or relocated within the facility. Manual tracking of relocated assets in the facility is generally a laborious process and can be a significant drain on workplace productivity. On the other hand, installing complex and expensive hardware for tracking assets may not be feasible or practically desirable.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
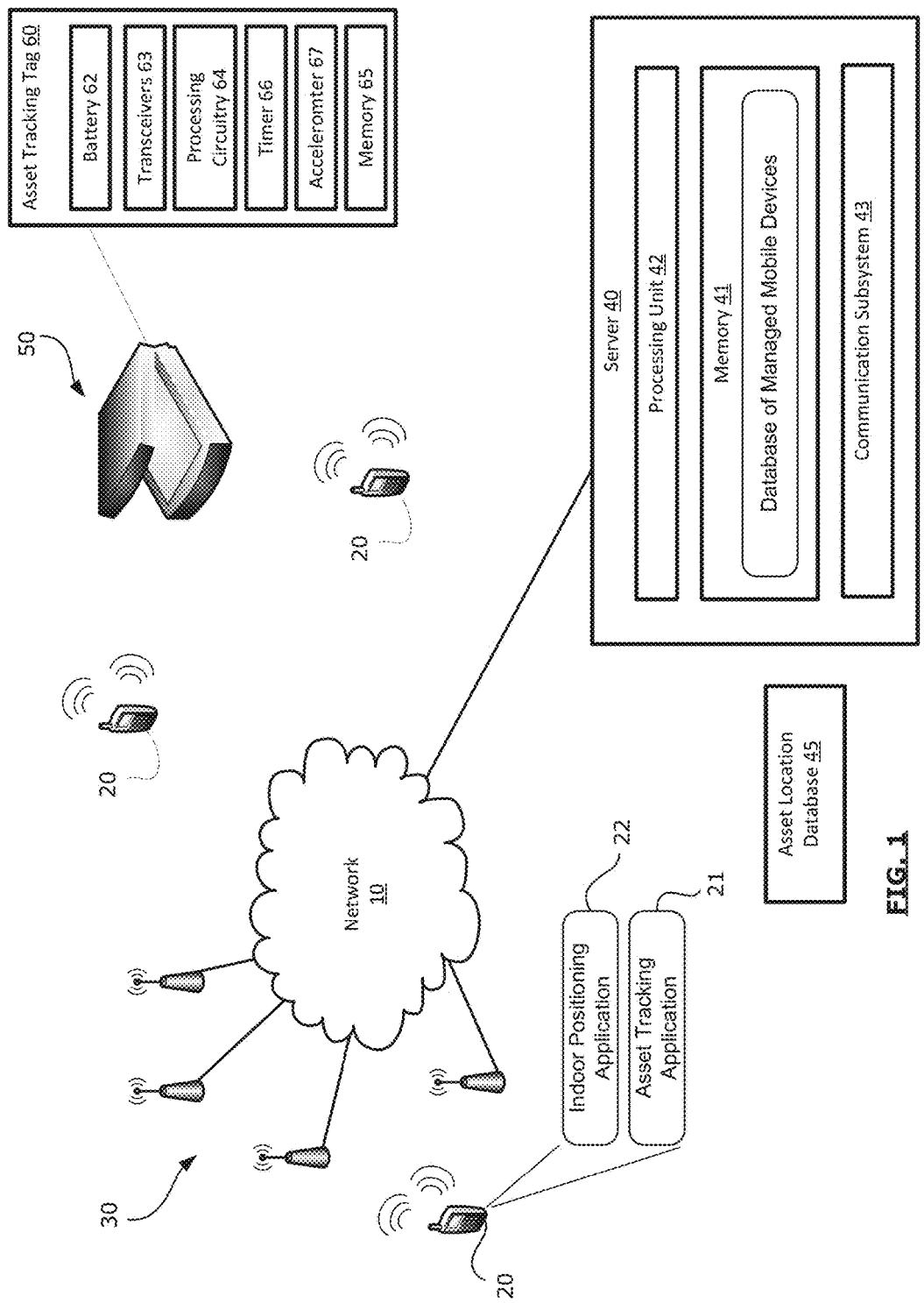
FIG. 1 diagrammatically shows an asset tracking system for an indoor facility in accordance with example embodiments of the present disclosure.

The present application describes tracking the location of an asset in an indoor facility based on crowd-sourced data. A mobile device in an indoor facility may be used to detect a collision with a signal broadcast by an asset tracking tag associated with an asset. Location information associated with the mobile device at the time of detecting the collision with the signal may be used to update an estimate of the physical location of the asset. Crowd-sourced data from a plurality of devices may help to refine and improve the reliability of a lightweight asset tracking system for an indoor facility.

In one aspect, the present application describes a method implemented by a processor of a server for tracking an asset in an indoor facility. The method includes: receiving, from a first mobile device, an asset tracking tag collision report, the asset tracking tag collision report including a tag identifier of an asset tracking tag associated with the asset, wherein the tag identifier is transmitted to the first mobile device in a wireless signal broadcast by the asset tracking tag when the asset tracking tag determines that the asset has moved; determining a new location of the asset based on the received asset tracking tag collision report; updating an asset location database to indicate the new location of the asset; and, in response to determining the new location of the asset, transmitting an instruction message to a mobile device to cause the mobile device to direct the asset tracking tag to cease broadcasting the wireless signal.

In another aspect, the present application describes a system for tracking an asset in an indoor facility. The system includes: an asset tracking tag associated with the asset, the asset tracking tag having at least one sensor, wherein the asset tracking tag initiates broadcasting a wireless signal upon determining that the asset has moved; a first mobile device configured to detect the wireless signal broadcast by the asset tracking tag; and a server connected to the first mobile device, wherein the server is configured to: receive, from the first mobile device, an asset tracking tag collision report, the asset tracking tag collision report including a tag identifier of the asset tracking tag; and update an asset location database to indicate a new location of the asset based on the received asset tracking tag collision report.

Other example embodiments of the present disclosure will be apparent to those of ordinary skill in the art from a review of the following detailed descriptions in conjunction with the drawings.

Modern mobile devices, such as cellular phones, are often equipped with a Global Positioning System (GPS) receiver chip and antenna which enable a mobile device to determine its location using broadcast signals received from four or more satellites. While GPS functionalities in mobile devices may provide reasonably accurate location information when there is an unobstructed line of sight to four or more GPS satellites, GPS may not be suitable for use in an indoor setting, as signals from satellites may be attenuated and scattered by roofs, walls or other interior features.

Instead of relying on use of satellites, some systems employ radio frequency identification (RFID) technologies for locating objects in GPS-denied environments such as office buildings. In such systems, wireless RFID tags may be connected to assets to assist in tracking the locations of the assets within an indoor facility. These dedicated tracking systems typically involve a plurality of RFID gateway readers and passive or active RFID tags connected to assets. The readers continuously monitor the locations of the assets by sending out trigger or polling signal to which the tags respond. These types of solutions require costly dedicated infrastructure to be distributed throughout a facility and may require extensive maintenance.

In one aspect, the present application proposes an asset tracking system that uses crowd-sourcing to locate assets within an indoor facility using an indoor location system. In an enterprise environment, the data may be obtained from devices associated with a plurality of employees of the enterprise. Rather than installing nodes/gateways at many points throughout the facility or relying on transmissions from expensive, location-aware tags, the present system and method may collect location data associated with user devices, in their ordinary use within the facility, that are in close proximity to one or more assets being monitored in order to approximate the locations of those assets.

System Overview

Reference is now made to FIG. 1, which diagrammatically shows an example embodiment of an asset tracking system 100 for an indoor facility 110. The asset tracking system 100 is connected to a network 10. The network 10 may include one or more wired or wireless communication networks, or combinations of both. For example, the network 10 may be a Wireless Local Area Network (WLAN) that conforms to the IEEE 802.11 standards (sometimes referred to as Wi-Fi). The network 10 includes one or more wireless access points (APs) 30, such as Wi-Fi APs, which can transmit and receive radio frequencies for communication with wireless-enabled devices. The wireless APs 30 provide wireless connectivity to mobile devices 20 and any computing devices within a local coverage area (such as an indoor facility) that are equipped for wireless communication using a designated protocol, such as IEEE 802.11. In at least some embodiments, the wireless APs 30 are distributed throughout the facility in known locations and each wireless AP 30 may be configured to periodically broadcast an identifier unique to the AP 30.

The asset tracking system 100 includes one or more mobile devices 20. In at least some embodiments, the mobile device 20 may be a communication device such as a cellular phone. In the asset tracking system 100 of FIG. 1, the mobile devices 20 are equipped for wireless communication via the wireless APs 30 and are capable of receiving broadcast messages or signals output by the wireless APs 30. According to known techniques, a mobile device 20 can also measure the relative received signal strength (RSSI) of detected signals from the wireless APs 30 as well as other sources of radio frequency transmission. An RSSI is a measurement of the power present in a received radio signal. The mobile devices 20 may send and receive communication signals over the network 10 after the required network registration or activation procedures have been completed. It will be appreciated that the asset tracking system 100 may also include one or more stationary electronic devices (not shown) such as desktop computers or Voice over IP (VoIP) phones.

In at least some embodiments, the mobile devices 20 may be managed by a Mobile Device Management (MDM) system. An MDM system includes a central server component, which administers and monitors the mobile devices 20, and a client component, which can be run on a mobile device 20 to receive and execute management commands from the server component. The MDM system enables an administration server to, among other functionalities, configure and update device settings over-the-air, enforce security policies and compliance rules, and remotely deploy applications to end-users. Many MDM systems are implemented via device management software that can run on subscriber devices.

The mobile device 20 may include an asset tracking application 21. The asset tracking application 21 detects wireless signals broadcast by an asset tracking tag 60 associated with an asset 50 in the indoor facility 110. In at least some embodiments, the asset tracking application 21 detects RSSI measurements for the wireless signals transmitted by asset tracking tag 60.

In some embodiments, the mobile device 20 may include an indoor positioning application 22. For example, in a network such as the WLAN of FIG. 1, an indoor positioning application 22 may detect RSSI measurements for wireless signals from a plurality of APs. The indoor positioning application 22 can be configured to send the measured RSSI values to a remote server implementing an indoor positioning system. The server may then perform the computational work of correlating the RSSI values measured by the mobile device 20 with wireless AP fingerprints that are themselves correlated to a location in the indoor facility 110. In this manner, the indoor positioning application 22 may determine, for example, the current location of the mobile device 20. In some other embodiments, the indoor positioning application 22 may itself attempt to correlate measured RSSI values with wireless AP fingerprint data for the indoor facility 110, without transmitting the RSSI measurements to a remote server. The wireless AP measurements may be obtained from a chipset, such as a Wi-Fi chip.

Other techniques for indoor navigation may be implemented by the indoor positioning application 22. For example, sensor data may be collected from a plurality of built-in sensors on the mobile device 20, such as accelerometers, gyroscopes and/or magnetometers, and processed by the indoor positioning application 22 for implementing a sensor fusion algorithm. As a further example, the indoor positioning application 22 may be configured to measure a round-trip time (RTT) to a plurality of wireless APs, based on signals exchanged with the APs, in order to estimate a current position of the mobile device 20. In at least some embodiments, the indoor positioning application 22 may use one or more hybrid algorithms for determining positions with the indoor facility 110. In particular, a combination of techniques that exploit properties of wireless signals received from wireless APs may be implemented by the indoor positioning application 22. For example, a hybrid RSSI-RTT localization technique may be employed for tracking the location of the mobile device 20.

The asset tracking application 21 and the indoor positioning application 22 may be standalone applications or integrated with one another. For example, the indoor positioning application 22 may be integrated into the asset tracking application 21, allowing a graphical map interface module of the asset tracking application 21 to display the relative position of the mobile device 20 with respect to one or more tracked assets 50 within the indoor facility 110.

The mobile device 20 may include a short-range wireless communication interface which provides for communication between the mobile device 20 and different systems or devices, which need not necessarily be similar devices. For example, the short-range communication interface may include an infrared device and associated circuits and components, or a Bluetooth® module to provide for communication with similarly-enabled systems and devices.

The asset tracking system 100 includes a plurality of asset tracking tags 60 associated with tracked assets 50 within the indoor facility 110. Assets may be shared between two or more employees or transferred from one employee to another employee in an enterprise. For example, as illustrated in FIG. 1, the asset 50 may be office equipment. Such assets may often be misplaced or not returned to their originating locations after use, or deliberately relocated to new locations within the indoor facility 110. A task of the asset tracking system 100 is to attempt to estimate the location of the assets 50 to a reasonably high degree of accuracy.

The asset tracking tag 60 includes a housing 61 which provides a durable structure to hold the components of the asset tracking tag 60. The housing 61 of the asset tracking tag 60 may be integral with the asset 50 or may be secured to the asset 50 by affixing to an exterior surface of the asset 50. For example, the asset tracking tag 60 can be attached to an asset 50 using an adhesive strip on at least one surface of the housing 61 of the asset tracking tag 60.

The asset tracking tag 60 also includes a battery 62. The battery 62 powers the components of the asset tracking tag 60. In at least some embodiments, the battery 62 is replaceable. The housing 61 of the asset tracking tag 60 may include a built-in indicator providing visual or auditory indication of the charge state of the battery 62. For example, a light-emitting diode (LED) indicator may be turned on or set to blink when the detected level of battery charge falls below a threshold value.

When the asset 50 is displaced from a resting position within the indoor facility 110, the asset tracking tag 60 associated with the asset 50 can be used for broadcasting a signal to indicate that the asset 50 is either in motion or has come to a rest at a new location within the facility. The asset tracking tag 60 may include at least one wireless transceiver 63 for transmitting wireless signals. A signal broadcast by the asset tracking tag 60 may be received by one or more electronic devices within a vicinity of the asset 50. In at least some embodiments, the wireless transceiver 63 may transmit signals using short-wavelength ultra-high frequency (UHF) radio waves. For example, the radio waves may be in the Industrial, Scientific and Medical (ISM) 2.4 GHz short-range radio frequency band. In some embodiments, the wireless transceiver 63 may be based on the Bluetooth® Low Energy (BTLE) specification, which can provide considerably reduced power consumption and cost compared to classic Bluetooth® while maintaining a similar communication range. It will be appreciated that the asset tracking tag 60 may also or alternatively implement other types of short-range radio frequency communication protocols, such as near-field communication (NFC). The asset tracking tag 60 is capable of sending data to and receiving data from those electronic devices in the indoor facility 110 that are equipped for wireless communication.

The asset tracking tag 60 may also include one or more sensors. In at least some embodiments, the asset tracking tag 60 includes an accelerometer 67. The accelerometer 67 is a device that generates an output signal in dependence on the acceleration of the accelerometer 67 and specifies the magnitude and/or direction of acceleration. The accelerometer 67 may be integrated into the housing 61 of the asset tracking tag 60 and generate accelerometer outputs based on movements of the asset tracking tag 60.

The accelerometer 67 defines one or more sensing axes. For example, the accelerometer 67 may include three orthogonal sensing axes corresponding to the accelerometer's x sensing axis, y sensing axis and z sensing axis. The accelerometer 67 may produce an accelerometer reading for each of the sensing axes. For example, an accelerometer reading $a_x$ may be produced by the accelerometer 67 based on measurements associated with the x sensing axis (such as an acceleration along the x sensing axis), an accelerometer reading $a_y$ may be produced by the accelerometer 67 based on measurements associated with the y sensing axis (such as an acceleration along the y sensing axis), and an accelerometer reading $a_z$ may be produced by the accelerometer 67 based on measurements associated with the z sensing axis (such as an acceleration along the z sensing axis). These accelerometer readings may collectively form the accelerometer output. In particular, the accelerometer output is an electronic signal which represents the accelerometer readings $a_x$, $a_y$, $a_z$ for each of the sensing axes of the accelerometer 67.

The asset tracking tag 60 may also include processing circuitry 64, memory 65 and a timer 66. The processing circuitry 64 may include any combination of digital or analog circuitry for receiving signals from the accelerometer 67 and controlling operations of the transceiver 63 in accordance with a desired protocol of operation. Example operations are described below. In some embodiments, the processing circuitry 64 may include discrete logic components, a field programmable gate array (FPGA), an application specific integrated circuit (ASIC), or other digital or analog circuitry.

The timer 66 may be a separate circuit element that is coupled to the processing circuitry 64 and is capable of providing a timestamp for an event associated with the asset tracking tag 60. In some cases the timer 66 is implemented by the processing circuitry 64 instead of being a separate element. In at least some embodiments, the processing circuitry 64 may be coupled to one or more of the wireless transceiver 63, the accelerometer 67, the timer 66, the battery 62 and memory 65.

The asset tracking system 100 further includes a server 40 connected to the network 10. The server 40 may be configured to determine the location information associated with one or more of the mobile devices 20 and perform the computational work in estimating the locations of assets 50 within the indoor facility 110. In at least some embodiments, the server 40 may be implemented as a collection of a plurality of server computers. The server 40 may include a memory 41, a processing unit 42 and a communication subsystem 43. In some embodiments, the memory 41 may store device information for one or more of the mobile devices 20 and their associated locations within the indoor facility 110. For example, the memory 41 may contain a database of managed mobile devices 20 in the indoor facility 110. For a managed mobile device 20, the database may indicate one or more of: a device identifier (e.g. serial number, phone number), a user associated with the device 20, history of visited locations in the indoor facility 110 (including appropriate timestamps) and a current location of the device 20. The memory 41 may optionally store map data identifying the current locations of the managed mobile devices 20. In some cases, the server 40 may not have device information for the mobile devices 20 in the indoor facility 110. In other words, when a mobile device 20 in the indoor facility 110 detects a wireless signal from an asset tracking tag 60, the mobile device 20 may be configured to establish a connection to the server 40 for the first time and transmit device information for the mobile device 20 to the server 40 for processing by the server 40.

The server 40 of the asset tracking system 100 has access to an asset location database 45. For example, the asset location database 45 may be stored in the memory 41 or remotely accessed by the server 40 for retrieving and updating location data associated with the assets 50. In at least some embodiments, the asset location database 45 keeps track of the locations of assets 50 as well as other useful information pertaining to the assets 50 and their associated asset tracking tags 60. For example, the asset location database 45 may contain data related to a tracked asset 50 including, but not limited to: asset identifier; identifier of associated asset tracking tag; history of locations within the facility 110 and relevant timestamps; a current location of the asset; identifiers of devices that reported detected signals from the associated asset tracking tag; first date of tracking; last date of location update; asset-user associations; and last date of change of battery of the associated asset tracking tag. In some embodiments, the asset location database 45 may include a graphical map interface module for displaying the current locations of tracked assets 50.

The processing unit 42 may include a single processor with multiple cores or multiple processors (with single or multiple cores). The processing unit 42 interacts with the communication subsystem 43 to perform communication functions via the network 10 with other systems, servers and/or devices such as the mobile devices 20.

In at least some embodiments, the server 40 may have access to or implement an indoor positioning system for the facility 110. The server 40 may connect to and retrieve location data for mobile devices 20 from an indoor positioning system. The indoor positioning system may, for example, be a system based on wireless AP fingerprints within the facility 110. The server 40 may itself implement the indoor positioning system or request location data associated with one or more mobile devices 20 from a separate indoor positioning system. That is, the location associated with a mobile device 20 in the facility 110 may be determined directly by the server 40 or a separate system to which the server 40 has access for sending and retrieving data.

Figure 2:
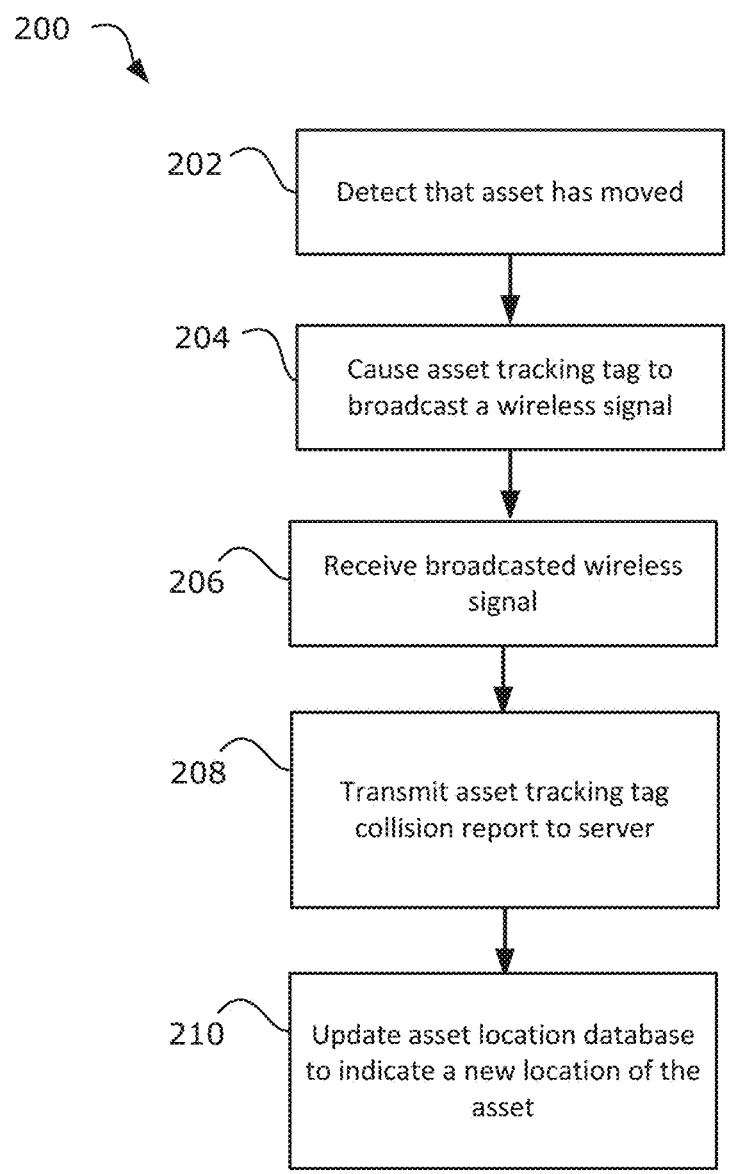
FIG. 2 shows, in flowchart form, an example method for tracking an asset in an indoor facility in accordance with example embodiments of the present disclosure.

Reference is now made to FIG. 2, which shows, in flowchart form, one example process 200 for tracking the location of an asset in an indoor facility using crowd-sourced data. The process 200 may be implemented by an asset tracking system such as the asset tracking system 100 shown in FIG. 1.

In operation 202, an asset tracking tag associated with a tracked asset detects that the asset has moved. When an asset is moved (e.g. carried) from a first location to a second location within a facility, the asset and its associated asset tracking tag may experience motion. In this case, a processing circuitry of the asset tracking tag may receive sensor data from one or more sensors contained in the asset tracking tag indicating that the associated asset has undergone movement. For example, an accelerometer associated with the asset tracking tag may detect an acceleration (e.g. a movement about a z sensing axis of the accelerometer) as well as a duration of the experienced acceleration.

In its default state, the processing circuitry of the asset tracking tag may be in a "sleep" mode, drawing little or no battery power. The accelerometer of the asset tracking tag may remain in a low-power, idle state. When a change in motion of the asset tracking tag is detected, the accelerometer is configured to signal the processing circuitry to wake up. Other mechanisms for preserving the battery level while monitoring the motion of the asset tracking tag may be available in some embodiments.

In order to determine whether the asset has moved from a first location, one or more thresholds may be established for comparing received accelerometer readings from the accelerometer of the asset tracking tag. In particular, outputs from the accelerometer of the asset tracking tag may be compared against threshold values. For example, if an accelerometer output exceeds a first pre-determined threshold value, the processing circuitry of the asset tracking tag may determine that the asset is experiencing motion. By way of further example, if the accelerometer readings, after accounting for possible bias, indicate a non-zero output for a duration longer than a pre-determined time interval, the processing circuitry of the asset tracking tag may determine that the asset is being moved. In some embodiments, a threshold value may be defined for each of the sensing axes of the accelerometer. If the accelerometer detects that output for one or more of the sensing axes is greater than the threshold value for the respective axis, the processing circuitry of the asset tracking tag may conclude that the asset is moving.

Once the processing circuitry of the asset tracking tag determines that the asset has moved, in operation 204, the processing circuitry may cause one or more wireless transceivers of the asset tracking tag to start broadcasting a wireless beacon signal. The wireless transceiver may initiate broadcasting the signal upon first detecting movement (e.g. when accelerometer output exceeds a first threshold value) or when the processing circuitry determines that the asset has relocated and is resting at a new location (e.g. zero acceleration after a period of movement). If the wireless transceiver start to broadcast the signal at the first sign of motion, the signalling may continue throughout the duration of travel of the asset and after the asset has come to a rest or may continue until a maximum time is reached. If the maximum time is reached and the asset is still undergoing movement, then the broadcasting may cease until the asset is at rest again so as to avoid draining the battery during lengthy travel (e.g. during shipping).

In at least some embodiments, the wireless transceiver of the asset tracking tag may broadcast a signal when the asset is first deployed in the indoor facility. In particular, the asset tracking tag may be affixed to the asset at the time of deploying the asset. Broadcasting by the asset tracking tag upon first deployment of the asset may allow the asset to be tracked from the start of its deployment within the indoor facility and facilitate the server's determination of an initial location of the asset. In some other embodiments, a wireless signal may be broadcast when the asset tracking tag first becomes operational. For example, if the asset tracking tag is attached to the asset after the asset has already been deployed in the indoor facility, when the asset tracking tag is first activated, either manually or by registering with a remote server, the processing circuitry may cause a wireless beacon signal to be broadcast.

The signal broadcast by the asset tracking tag may include different types of data. The signal may represent data about the asset tracking tag, including, without limitation: unique identifier; product or manufacturer code; identifier of the associated asset; current battery status; time of detection of motion; state of motion (i.e. whether the asset is in motion or has come to a rest); and time of transmission of wireless signal. In some embodiments, the broadcast signal may represent other information associated with the asset or the asset tracking tag. For example, the signal may indicate that there is a problem with the asset (e.g. asset is being removed from a designated space) or the asset tracking tag (e.g. tag is malfunctioning).

In at least some embodiments, transmission of the broadcast signal may occur continuously at a pre-determined rate. In particular, the processing circuitry of the asset tracking tag may be programmed to establish a fixed transmission rate for the broadcast signal and to control the wireless transceiver to broadcast at the fixed rate.

In some embodiments, the transmission rate may be variable. For example, the transmission rate may depend, in part, on the remaining charge for the battery associated with the asset tracking tag. If the remaining charge of the battery falls below a threshold level, the transmission rate of the broadcast signal may be decreased. As a further example, the transmission rate may depend on the motion status of the asset tracking tag. In particular, the transmission rate may be different according to whether the asset is currently in motion or at rest at a new location. The asset tracking tag may determine its motion status based on sensor data and adjust the transmission rate according to the motion status. For example, the transmission rate may be higher when the asset is at rest. Other conditions may be used to vary the transmission rate of the broadcast signal from the asset tracking tag. In some embodiments, the transmission of the wireless signal may switch between a fixed rate and a variable rate. The asset tracking tag may continue to broadcast the signal until an explicit instruction is received to cease transmission of the signal. A degree of randomness in the frequency of broadcasts may be employed for collision avoidance in some embodiments.

In operation 206, a mobile device that is within range of the signal broadcast by the asset tracking tag detects the signal. It will be appreciated that both stationary (i.e. at-rest) and moving/travelling devices within the indoor facility may be capable of detecting the broadcast signal from the asset tracking tag, either during movement of the asset to a new location or after the asset has come to a rest at the new location, or both.

Upon detecting the broadcast signal from the asset tracking tag, the mobile device may generate an asset tracking tag collision report. An asset tracking tag collision report specifies an identifier of the asset tracking tag associated with the tracked asset. It will be appreciated that a device may detect a plurality of broadcast signals transmitted by the asset tracking tag. As such, the asset tracking tag collision report may include a timestamp associated with each of a plurality of signals received from the asset tracking tag. The asset tracking tag collision report may also include an RSSI associated with each of the received signals. In some embodiments, the mobile device may generate one asset tracking tag collision report for each received broadcast signal from the asset tracking tag. In particular, each time a broadcast signal is detected, the device may generate an asset tracking tag collision report, indicating, at least, a timestamp and an RSSI associated with that signal. In some other embodiments, the mobile device may generate one asset tracking tag collision report containing data for a plurality of received broadcast signals. The asset tracking tag collision report may also include an identifier of the mobile device that generated the report.

In at least some embodiments, the asset tracking tag collision report may specify a location of the mobile device associated with a time at which a broadcast signal from the asset tracking tag is received by the mobile device. That is, the asset tracking tag collision report may identify a location within the facility at the time when the mobile device detected a broadcast signal transmitted by the asset tracking tag. For example, when a broadcast signal is detected, an indoor positioning application on the mobile device may be used to identify a location of the mobile device associated with the timestamp for the detection of the broadcast signal. Where an asset tracking tag collision report includes data for multiple received broadcast signals, the report may indicate a location of the mobile device associated with each of the received signals. In some embodiments, the asset tracking tag collision report may include data that can be used by an indoor positioning system to determine a location of the mobile device within the facility at the time when the mobile device detected a broadcast signal from the asset tracking tag, without expressly indicating a specific location of the mobile device within the facility. For example, the asset tracking tag collision report may include RSSI measurements for wireless signals received from a plurality of APs, which measurements can be used by an indoor positioning system to identify a specific location in the facility.

In operation 208, the mobile device transmits the generated asset tracking tag collision report to a server. In at least some embodiments, the mobile device may transmit an asset tracking tag collision report to the server each time a broadcast signal is detected from the asset tracking tag. In other embodiments, the mobile device may generate one asset tracking tag collision report based on data from multiple received signals and transmit the report to the server.

A server receiving a plurality of asset tracking tag collision reports may be able to determine an updated location of a tracked asset based on data from the reports. The server may receive asset tracking tag collision reports from a plurality of devices which encounter broadcast signals from the asset tracking tag associated with the tracked asset. The server may also receive multiple asset tracking tag collision reports from a single device that detects broadcast signals from the asset tracking tag. In at least some embodiments, the server may determine the location of a device that transmits an asset tracking tag collision report. For example, if an asset tracking tag collision report includes an identifier of the mobile device that generated and transmitted the report, the server may use an indoor positioning system for the facility to determine the location of the mobile device based on the identifier. In some other embodiments, an asset tracking tag collision report may itself indicate the location of the mobile device that transmitted the report.

The server maintains a collisions history record of all asset tracking tag collision reports received from the mobile devices in the facility. For example, the entries in the collisions history record may be organized by timestamps associated with received signals (e.g. time of transmission of broadcast signal by asset tracking tag) as indicated in the asset tracking tag collision reports. In particular, for each time, the collisions history record may specify the identities of the mobile devices that detected a signal broadcast by the asset tracking tag as well as other relevant information about the respective received signal (e.g. RSSI). Where an asset tracking tag collision report includes the location of the mobile device that generated and transmitted the report, the collisions history record maintained by the server will also specify the location of the mobile device in association with the time at which the mobile device detected a broadcast signal from the asset tracking tag. Based on this crowd-sourced approach, the server may be able to collect sufficient amount of data from the asset tracking tag collision reports to develop and refine an estimate of a new location of the asset within the facility. That is, a determination of the new location of the asset includes obtaining an estimate of the new location based on data from the asset tracking tag collision reports.

One technique for deriving an estimate of the asset's location is trilateration. Given two independent measurements of distance from the asset to mobile devices with known locations, the location of the asset can be narrowed to two possibilities, and any additional information (e.g. a third distance measurement to a third mobile device with a known location) may uniquely identify the asset's location. In some embodiments, the system may use one or more signal parameters to assist in location determination. For example, an RSSI for the signal broadcast by the tag may be used to determine an estimated distance to a receiver from the source of the signal. While accurate distances may generally not be obtained using signal parameters alone, several indoor localization systems based on signal parameters have been successfully implemented. Such systems are described in, at least, "An indoor bluetooth-based positioning system: Concept, implementation and experimental evaluation." (Silke Feldmann, Kyandoghere Kyamakya, Ana Zapater, and Zighuo Lue. *International Conference on Wireless Networks*, pages 109-113, 2003), "Indoor localization using Bluetooth." (Tiago Fernandes., *6th Doctoral Symposium in Informatics Engineering*, pages 480-483, 2011), both of which are incorporated herein by reference. A simplified distance estimation model is given in "Accuracy of Location Identification with Antenna Polarization on RSSI" (Xu Huang, Mark Barralet, Dharmendra Sharma. *Proceedings of the International Multi-Conference of Engineers and Computer Scientists*, 2009) by equation (1):

$$RSSI = -(10 \times n) \log_{10} d - A \quad (1)$$

where RSSI is measured in dBm, n represents a path loss exponent (which depends on the propagation characteristics of the received signal), d is distance in meters between a transmitter and a receiver and A is a reference RSSI at a distance of 1 meter from the transmitter. In order to use equation (1), the values of n and A may be determined empirically. Other localization algorithms using trilateration may be used by the server to develop an estimate of the location of an asset based on data from a plurality of (i.e. at least three) asset tracking tag collision reports.

With each receipt of an asset tracking tag collision report, the server may use the additional data from the report to refine the computation of an estimate of the asset's location. In at least some embodiments, the server may include an asset location estimation module that is configured to apply a suitable localization algorithm to data from a plurality of received asset tracking tag collision reports. For a specific timestamp in the collisions history record maintained by the server, the server may use the one or more entries corresponding to the timestamp to determine the location of a mobile device that detected a broadcast signal from the asset tracking tag and an RSSI of the detected broadcast signal. The server may extract the location information of the mobile device from the asset tracking tag collision report itself or access an indoor positioning system for the facility in order to identify a location corresponding to the mobile device using the device's identifier (specified in the asset tracking tag collision report). For example, if the asset tracking tag collision report includes RSSI measurements for wireless signals received by the mobile device from a plurality of APs within the facility, the indoor positioning system may correlate the RSSI measurements with wireless AP fingerprints for the facility in order to determine the location of the mobile device. The location of the mobile device and the RSSI of the broadcast signal from the asset tracking tag that the device detects can be input to the asset location estimation module to generate an updated estimate of the new location of the asset at the relevant time.

In some cases, the server may not have sufficient data for a trilateration-based localization technique. For example, the server may receive no more than two asset tracking tag collision reports from mobile devices in the facility. In such cases, the server may be configured to collect context data about the tracked asset or the facility to determine an estimated location of the asset. For example, if the server only receives location data from two mobile devices detecting a broadcast signal, reducing the number of possible locations of the asset to two, the server may access an indoor positioning system for the facility and determine that one of the possibilities is an inaccessible location, thus eliminating the possibility as a viable location for the asset. As a further example, if the tracked asset is equipment for a presentation (e.g. projector screen, audiovisual equipment), the server may determine that the asset is not likely to be located in a washroom or kitchen area. In at least some embodiments, the server may extrapolate a location of an asset by forming a trajectory of the asset's traveled path or by using a dead reckoning technique.

It will be appreciated that, in an indoor facility, room-level localization is often sufficient for locating assets that are being tracked, and so a highly accurate measurement of distances may not be required. For example, if office equipment, such as a printer, fax machine or hole-punch, can be traced to a single room within a facility, it may be a simple process to locate the equipment inside the room.

In operation 210, the server updates an asset location database to indicate the new location of the asset. The asset location database may be stored in a memory associated with the server or stored at a remote location accessible by the server. In at least some embodiments, the asset location database may identify two variables, namely, "estimate of the new location of the asset" and "final determined new location of the asset". As the server receives an asset tracking tag collision report from a mobile device and refines an estimate of the asset's location based on the data from the report, the server will update the "estimate of the new location of the asset" variable. When the server determines, to a desired degree of confidence, the new location of the asset, the "final determined new location of the asset" variable can be set to the most recent value of the "estimate of the new location of the asset" variable.

In formulating estimates of the location of the asset based on data from a plurality of asset tracking tag collision reports, the server may be configured to apply suitable weightings to signal measurement data. In particular, in a triangulation-based localization algorithm, the server may place greater weight on the locations of some mobile devices than the locations of other mobile devices. For example, if a particular mobile device receives multiple signals from the asset tracking tag, the location(s) of that mobile device may be accorded more weight in a localization algorithm than another mobile device which reports only a single detected signal. By way of further example, if a mobile device reports a high magnitude RSSI for a received signal, greater weight may be placed on the location(s) of that mobile device than other mobile devices. Other criteria for distribution of weights to the locations of different mobile devices in the server's localization algorithm may be available.

In at least some embodiments, the server may perform a check to determine whether an estimate of the new location of the asset satisfies a pre-determined confidence threshold. For example, after the server updates the "estimate of the new location of the asset" variable at the asset location database based on data from an asset tracking tag collision report, the server may verify, in real-time, whether the current value of the "estimate of the new location of the asset" variable satisfies a confidence threshold.

Various confidence thresholds may be appropriate for estimating the location of an asset. For example, the confidence threshold may be satisfied if more than a threshold number of asset tracking tag collision reports from different mobile devices is received by the server for a certain time. As a further example, if more than a threshold number of signals is received by a single mobile device, the mobile device may correspond to a user who is physically moving the asset, suggesting that an estimate of the asset's location based on the location of the user's mobile device is likely to be accurate. The server may also consider other factors in determining that an estimate of the asset's location is confidently correlated to its actual location, including the state of motion of the asset (i.e. whether the asset is in motion or at rest) and magnitude of RSSI of received signals. In at least some embodiments, a memory associated with the server may store one or more pre-determined rules regarding confidence thresholds for estimates of an asset's location.

If the server determines that a confidence threshold is satisfied, the server may select a device in the facility and instruct the device to cause the asset tracking tag associated with the tracked asset to cease broadcasting its wireless signal. When it is determined that a server's estimate of the asset's location is accurate to a desired degree, the asset tracking tag can be alerted so that signal transmission can be halted, preventing any unnecessary power consumption by the asset tracking tag. In at least some embodiments, the server selects a device (either stationary or mobile) that is determined to be located close to the estimated location of the asset. The device that is selected may be one of the devices that transmitted an asset tracking tag collision report to the server. The selected device may also be a device that is managed by the server or a device whose location is known to the server and is communicably connected to the server. If the server is unable to communicate an instruction message to a selected device, a different device may be selected. The order of selection of devices may be based, at least in part, on proximity of the devices to the estimated location of the asset. In some embodiments, a confidence threshold does not need to be satisfied for the server to direct a mobile device to cause the asset tracking tag to stop transmitting its signal.

In some embodiments, if the server determines that an estimate of the new location of an asset satisfies a confidence threshold, the server may instruct a plurality of devices in the facility to instruct the asset tracking tack to cease broadcasting Rather than selecting a single device for the task of shutting off the signal broadcasting by the asset tracking tag, the server may instruct a plurality of devices to listen for the asset tracking tag so that further broadcasting can be prevented. When a first one of the plurality of devices detects the asset tracking tag (e.g. detects a signal broadcast by the asset tracking tag), the mobile device may then transmit an instruction to the asset tracking tag to cease broadcasting its signal. In some embodiments, the mobile device may also notify the server that broadcasting by the asset tracking tag has been discontinued. Upon receiving a confirmation from the mobile device that the broadcasting of the asset tracking tag has been halted, the server may advise the other devices in the plurality of devices that they need not look for that asset tracking tag any longer. This "cancellation" instruction prevents the devices from later inadvertently turning off the asset tracking tag if it is moved again and begins rebroadcasting.

Figure 3:
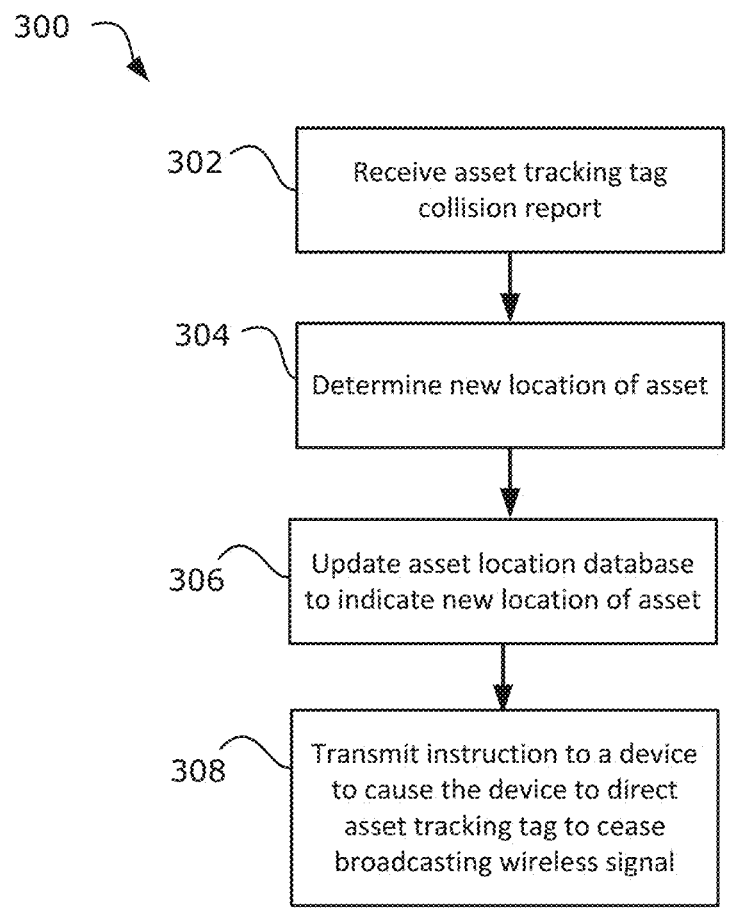
FIG. 3 shows, in flowchart form, another example method for tracking an asset in an indoor facility in accordance with example embodiments of the present disclosure.

Reference is now made to FIG. 3, which shows, in flowchart form, a server-implemented method for tracking an asset in an indoor facility. In at least some embodiments, the process 300 may be implemented by a server such as the server 40 of FIG. 1. By way of example, the process 300 may be implemented by a Mobile Device Management server which manages a plurality of the mobile devices 20 in the indoor facility 110 (shown in FIG. 1). The server is communicably connected to the mobile devices in the indoor facility via a wireless network, such as a WLAN.

In operation 302, the server receives an asset tracking tag collision report from a mobile device in the indoor facility. An asset tracking tag initiates broadcast of a wireless signal upon detecting that the asset with which it is associated is moving or has moved to a different location in the facility. The wireless signal may be broadcast continuously by the asset tracking tag at a pre-determined fixed transmission rate or at a variable rate. When a mobile device moves into range of the broadcast signal, the mobile device detects an RSSI of the received signal and receives data represented in the signal. For example, the mobile device may receive, at least, a tag identifier for the asset tracking tag that broadcast the signal.

The mobile device may be configured to generate and send an asset tracking tag collision report on detecting a broadcast signal from the asset tracking tag. An asset tracking tag collision report includes information, provided by a mobile device in the facility, which may assist the server to determine an approximate location of a tracked asset. In at least some embodiments, the asset tracking tag collision report may specify, at least, a tag identifier of the asset tracking tag associated with the tracked asset, an identifier of the mobile device which detected the broadcast signal, an RSSI of the signal received by the mobile device, and a timestamp associated with the signal detection event.

The mobile device may send an asset tracking tag collision report to the server each time a broadcast signal is detected by the mobile device. Alternatively, the mobile device may collect and store signal measurement data in a memory associated with the mobile device and generate a single asset tracking tag collision report for a plurality of signal detection events. For example, the mobile device may send one asset tracking tag collision report to the server, providing the associated timestamp and RSSI measurement data for each broadcast signal received from the asset tracking tag.

When the server receives an asset tracking tag collision report from a mobile device, the server determines a location associated with the mobile device within the indoor facility for each signal detection event included in the asset tracking tag collision report. In particular, the server determines the locations where the mobile device detected broadcast signals. In at least some embodiments, for each signal detection event, the server may access an indoor positioning system for the indoor facility and use the identifying information for the mobile device to determine a location of the mobile device at the time that the signal was detected. In some other embodiments, the mobile device may itself determine its location for each signal detection event and indicate, in the asset tracking tag collision report, the location corresponding to the timestamp for the signal detection event. For example, the mobile device may request its location from an on-board indoor positioning application when a broadcast signal is detected from the asset tracking tag and store this location information with the associated timestamp for the detected signal in memory.

By collecting data from a plurality of asset tracking tag collision reports associated with an asset tracking tag, the server can maintain a record of all signal detection events for the asset tracking tag. Based on the record of signal detection events, the server can obtain estimates of the location of the asset tracking tag and the associated asset. For example, if the server has location information for three or more devices that each detected a broadcast signal from the asset tracking tag at a given time (or a range of time) and the signal strength information (i.e. RSSI) of the signal detected by the respective devices, the server can perform trilateration to determine an estimate of the location of the asset tracking tag at the given time (or range of time). Using a crowd-sourced approach, the server can receive asset tracking tag collision reports from a plurality of mobile devices or a plurality of asset tracking tag collision reports from a single device to develop and refine an estimate of the tracked asset's location within the facility.

In operation 306, the server updates an asset location database to indicate a new location of the tracked asset. The server can update the asset location database when a final estimate of the asset's location is determined or the server can update the asset location database on a more frequent basis. For example, the server may update the database each time that an estimate of the asset's location is updated using data from a signal detection event.

In operation 308, the server transmits an instruction to one or more mobile devices within the facility to cause the mobile device(s) to direct the asset tracking tag to cease broadcasting its signal. That is, the server can control when and how to shut off the signal broadcasting from the asset tracking tag. For example, when the server determines that the estimate of the new location of the asset has been ascertained to a desired degree of accuracy, the server may instruct one or more managed mobile devices to direct the asset tracking tag to stop broadcasting. The asset tracking tag will start broadcasting again upon determining that the associated asset is moving or has been moved again.

Where the server has access to an indoor positioning system for the facility, the server can select a device that is known to be close to the estimated new location of the asset for the task of directing the asset tracking tag to shut off the signal broadcasting. In some embodiments, the selected device may be a mobile device that transmitted an asset tracking tag collision report to the server. In other embodiments, the selected device may be any electronic device that is located in the vicinity of the asset's estimated new location. For example, the selected device may be a Bluetooth®-enabled device located in a room determined to be the room to which the asset has been relocated.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A server-implemented method for tracking an asset in a Global Positioning System (GPS)-denied indoor facility, comprising:
   receiving at the server, from two or more of a plurality of mobile devices in the indoor facility that are connected to the server via a wireless communication network, asset tracking tag collision reports, each asset tracking tag collision report including a tag identifier of an asset tracking tag associated with the asset, wherein the tag identifier is transmitted to the mobile devices in wireless signals broadcast by the asset tracking tag when the asset tracking tag determines that the asset has moved;
   determining, at the server, a new location of the asset based on the received asset tracking tag collision reports and locations of the two or more mobile devices at their respective time of detection of the wireless signals;
   updating an asset location database to indicate the new location of the asset; and
   in response to determining the new location of the asset, transmitting an instruction message to a first one of a plurality of mobile devices in the indoor facility to cause the first one of the plurality of mobile devices to direct the asset tracking tag to cease broadcasting the wireless signal.

2. The method of claim 1, wherein each asset tracking tag collision report contains location information regarding the location of a respective one of the two or more mobile devices within the indoor facility at the time when the wireless signal was detected by said one of the mobile devices.

3. The method of claim 2, wherein the location information identifies a location within the facility determined by said one of the mobile devices using an indoor positioning application.

4. The method of claim 2, wherein the location information includes wireless access point signal measurements from said one of the mobile devices and wherein the method further comprises determining a location of said one of the mobile device based on the wireless access point signal measurements using an indoor positioning system.

5. The method of claim 1, wherein each asset tracking tag collision report further includes a received signal strength indicator (RSSI) of the wireless signal detected by a respective one of the two or more mobile devices.

6. The method of claim 1, wherein determining the new location of the asset comprises determining whether the new location of the asset meets a predetermined confidence threshold.

7. The method of claim 1, wherein the asset tracking tag is affixed to or integral with the asset.

8. The method of claim 1, wherein the asset tracking tag determines that the asset has moved based on sensor data received from at least one sensor associated with the asset tracking tag.

9. The method of claim 8, wherein the at least one sensor comprises an accelerometer.

10. The method of claim 1, further comprising maintaining a record of asset tracking tag collision reports for the asset received from the two or more mobile devices.

11. The method of claim 10, wherein determining the new location of the asset comprises obtaining an estimate of the new location of the asset by a trilateration method based on data from the asset tracking tag collision reports received from the two or more mobile devices.

12. The method of claim 1, wherein transmitting the instruction message to the first one of the plurality of mobile devices comprises transmitting the instruction message to a plurality of mobile devices within the facility, whereby the first one of the plurality of mobile devices is the next of the plurality of mobile devices to detect the wireless signal from the asset tracking tag.

13. A system for tracking an asset in a Global Positioning System (GPS)-denied indoor facility, comprising:
   an asset tracking tag associated with the asset, the asset tracking tag having at least one sensor, wherein the asset tracking tag broadcasts wireless signals upon determining that the asset has moved;
   a plurality of mobile devices in the indoor facility configured to detect the wireless signals broadcast by the asset tracking tag; and
   a server connected to the plurality of mobile devices via a wireless communication network, wherein the server is configured to:
      receive at the server, from two or more of the plurality of mobile devices, asset tracking tag collision reports, each asset tracking tag collision report including a tag identifier of the asset tracking tag;

determine, at the server, a new location of the asset based on the received asset tracking tag collision reports and locations of the two or more mobile devices at their respective time of detection of the wireless signals;

update an asset location database to indicate the new location of the asset; and in response to determining the new location of the asset, transmit an instruction message to a first one of the plurality of mobile devices in the indoor facility to cause the first one of the plurality of mobile devices to direct the asset tracking tag to cease broadcasting the wireless signal.

14. The system of claim 13, wherein the server is further configured to determine locations of the two or more mobile devices within the indoor facility at the time when the wireless signals were detected by the mobile devices.

15. The system of claim 13, wherein each asset tracking tag collision report further includes a received signal strength indicator (RSSI) of the wireless signal detected by a respective one of the two or more mobile devices.

16. The system of claim 13, wherein the server is further configured to determine that the new location of the asset meets a predetermined confidence threshold and wherein the instruction message is transmitted to the first one of the plurality of mobile devices in response to determining that the new location of the asset meets the predetermined confidence threshold.

17. The system of claim 13, wherein the asset tracking tag determines that the asset has moved based on output data received from an accelerometer.

18. The system of claim 13, wherein the server is further configured to maintain a record of asset tracking tag collision reports for the asset received from the two or more mobile devices.

19. The system of claim 18, wherein determining the new location of the asset comprises obtaining an estimate of the new location by a trilateration method based on data from the asset tracking tag collision reports received from the two or more mobile devices.

20. The system of claim 13, wherein the asset tracking tag broadcasts a wireless signal upon determining that the asset has been deployed for the first time.

21. A non-transitory computer-readable medium storing processor-executable instructions for a server to track an asset in a Global Positioning System (GPS)-denied indoor facility, wherein the instructions comprise:

instructions to receive at the server, from two or more of a plurality of mobile devices in the indoor facility that are connected to the server via a wireless communication network, asset tracking tag collision reports, each asset tracking tag collision report including a tag identifier of an asset tracking tag associated with the asset, wherein the tag identifier is transmitted to the mobile devices in wireless signals broadcast by the asset tracking tag when the asset tracking tag determines that the asset has moved;

instructions to determine, at the server, a new location of the asset based on the received asset tracking tag collision reports and locations of the two or more mobile devices at their respective time of detection of the wireless signals;

instructions to update an asset location database to indicate the new location of the asset; and instructions to transmit, in response to determining the new location of the asset, an instruction message to a first one of the plurality of mobile devices in the indoor facility to cause the first one of the plurality of mobile devices to direct the asset tracking tag to cease broadcasting the wireless signal.

* * * * *